J. B. FORD.
Apparatus for the Manufacture of Glass-Pipe.

No. 217,789. Patented July 22, 1879.

WITNESSES
Robert Ewett
James J. Sheehy

INVENTOR
John B. Ford.
Gilmore Smith & Co
ATTORNEYS

UNITED STATES PATENT OFFICE.

JOHN B. FORD, OF JEFFERSONVILLE, INDIANA.

IMPROVEMENT IN APPARATUS FOR THE MANUFACTURE OF GLASS PIPE.

Specification forming part of Letters Patent No. 217,789, dated July 22, 1879; application filed June 13, 1879.

*To all whom it may concern:*

Be it known that I, JOHN B. FORD, of Jeffersonville, in the county of Clarke and State of Indiana, have invented certain new and useful Improvements in Apparatus for the Manufacture of Glass Pipe; and I do hereby declare that the following is a full, clear, and exact description of the construction and operation of the same, reference being had to the annexed drawings, making a part of this specification, and to the letters and figures of reference marked thereon.

Figure 1:
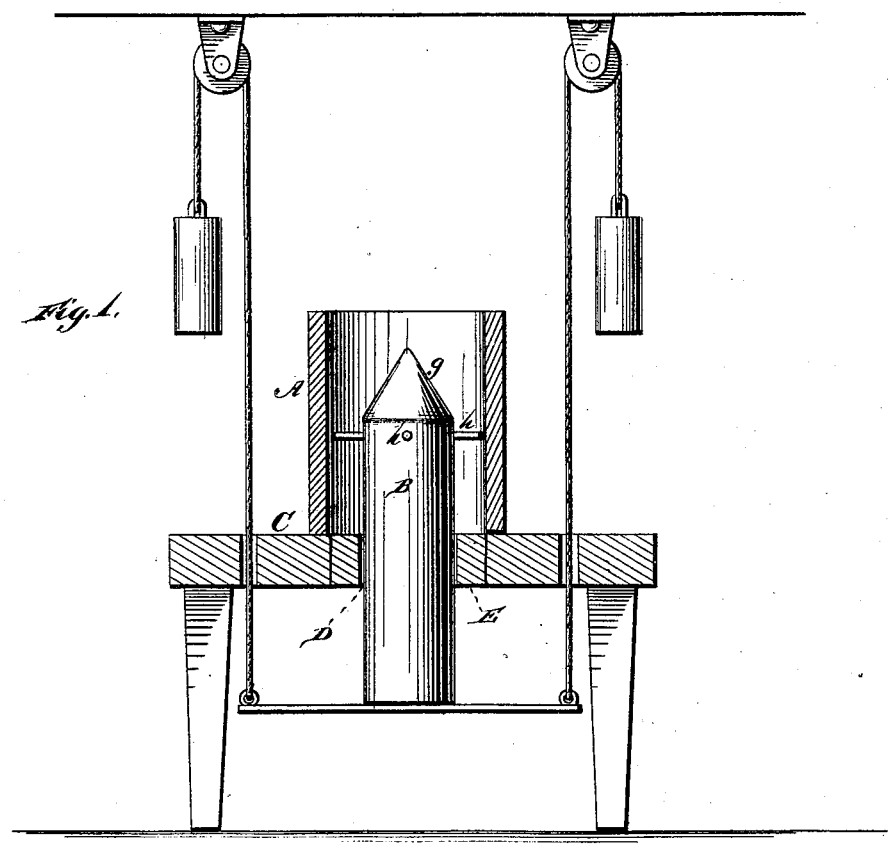
Figure 2:
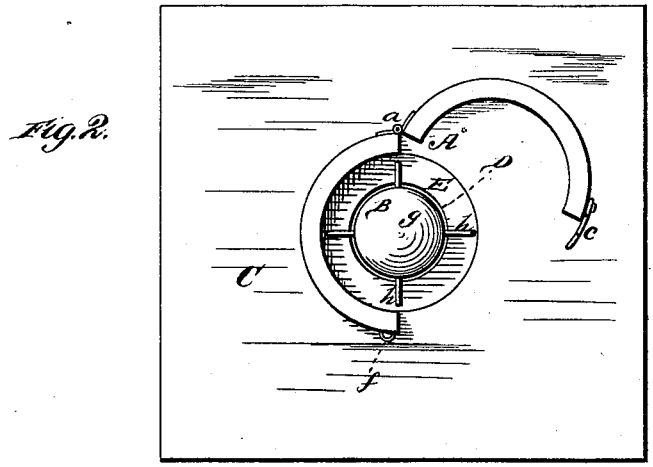

Figure 1 of the drawings is a representation of a vertical section of my device, and Fig. 2 is a plan view of the same.

My invention has relation to apparatus for the manufacture of glass pipe; and it consists in the improvements in the construction of such apparatus as will be hereinafter described and particularly pointed out in the claim.

Heretofore tubular vessels of glass, such as tumblers, have been constructed in an apparatus consisting of a mold and plunger, the latter working downward in the mold upon a closed bottom. It is found that by reason of the readiness with which the melted glass becomes cooled and congealed such apparatus can only be effective in forming tubes about fourteen inches in length.

I have discovered that by forming the mold with an open bottom, through which the plunger is forced upward while the melted glass is poured in at the top, tubes or pipes from ten to twelve feet in length may be easily formed. To this end I have constructed the apparatus shown in the drawings, of which the letter A represents the mold, and B the plunger.

It will be observed that my mold is arranged upon a platform, C, and has an opening through its bottom, marked D, corresponding in size and shape to the body of the plunger, and is also provided with an annular ring, E, upon which the glass falls when poured into the mold. The width of said ring determines the thickness of the pipe to be cast, inasmuch as such thickness will always correspond to the space between the inner wall of the mold and the exterior of the plunger.

My mold is also provided with hinges $a$ $a$ and latch or hook $e$ and staple $f$, for the purpose of releasing and removing the pipe when formed.

A great variety of means may be employed for raising the plunger, such as springs, windlass, lever, and other well-known mechanical devices. I have shown on the drawings a set of pulleys and weights, which perform the functions satisfactorily; but I do not wish to confine myself to their use alone. Any suitable means for operating the plunger with certainty and dispatch may be employed without departing from my invention.

In case the pulleys, cords, and weights shown on the drawings be employed, they should be provided with suitable regulating mechanism, which I have not shown.

It will be observed that my plunger is provided with a conical head, $g$, and guiding-pins $h$.

In forming my glass pipe the operator pours the melted glass into the open top of the mold and at the same time allows the lifting machinery to raise the plunger vertically therein. The glass falls upon the conical head of the plunger, and settles downward and against the wall of the mold, thereby forming a pipe corresponding to the height of the mold and of a thickness corresponding to the ring E or the space between the plunger and the wall. After the tube is thus formed I remove it from the mold, and usually pass it to an annealing pit or oven, after which process it is ready for use. Such glass pipe is strong, durable, and not subject to disaster by ordinary climatic disturbances, and the pores are so fully closed that escape of water or gas through them is impossible, and neither insects nor oxidization can affect it unfavorably.

I claim as my invention—

The apparatus for manufacturing glass pipe herein described, consisting of the mold A, plunger B, and suitable lifting mechanism, substantially as described.

In testimony that I claim the above I have hereunto subscribed my name in the presence of two witnesses.

JOHN B. FORD.

Witnesses:
JAMES J. SHEEHY,
ROBERT EVERETT.